(12) United States Patent
Cope et al.

(10) Patent No.: US 8,606,292 B1
(45) Date of Patent: Dec. 10, 2013

(54) METHODS AND SYSTEMS FOR LIMITING MOBILE STATION OPERATION IN A GROUP SETTING

(75) Inventors: Warren B. Cope, Olathe, KS (US); Pallavur A. Sankaranaraynan, Overland Park, KS (US); Bejoy Pankajakshan, Olathe, KS (US); John E. Belser, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 534 days.

(21) Appl. No.: 12/785,114

(22) Filed: May 21, 2010

(51) Int. Cl.
*H04W 24/00* (2009.01)

(52) U.S. Cl.
USPC ............ 455/456.1; 455/456.2; 455/456.3; 455/456.6; 455/575.9; 455/569.1; 455/569.2; 455/99; 455/238.1; 455/345; 455/436; 455/414.1

(58) Field of Classification Search
USPC ......... 455/456.1, 456.2, 456.3, 456.6, 575.9, 455/96, 569.2, 99, 238.1, 297, 345, 569.1, 455/436, 414.1
See application file for complete search history.

(56) References Cited

U.S. PATENT DOCUMENTS

| | | | |
|---|---|---|---|
| 6,256,558 B1 | 7/2001 | Sugiura et al. | |
| 6,353,778 B1 | 3/2002 | Brown | |
| 6,490,450 B1 * | 12/2002 | Batni et al. | 455/433 |
| 6,690,940 B1 | 2/2004 | Brown et al. | |
| 7,142,666 B1 | 11/2006 | Bates et al. | |
| 7,181,229 B2 | 2/2007 | Singh et al. | |
| 2003/0032460 A1 | 2/2003 | Cannon et al. | |
| 2003/0096621 A1 | 5/2003 | Jana et al. | |
| 2003/0109246 A1 | 6/2003 | Shimizu et al. | |
| 2004/0058678 A1 * | 3/2004 | deTorbal | 455/437 |
| 2005/0026619 A1 * | 2/2005 | Jha | 455/441 |
| 2005/0255874 A1 | 11/2005 | Stewart-Baxter et al. | |
| 2005/0272431 A1 * | 12/2005 | Katori et al. | 455/446 |
| 2005/0281237 A1 | 12/2005 | Heinonen et al. | |
| 2006/0099940 A1 | 5/2006 | Pfleging et al. | |
| 2007/0155421 A1 | 7/2007 | Alberth et al. | |
| 2009/0075593 A1 * | 3/2009 | Demirbasa et al. | 455/41.2 |
| 2009/0098855 A1 * | 4/2009 | Fernandez et al. | 455/410 |
| 2009/0111422 A1 | 4/2009 | Bremer et al. | |
| 2010/0035588 A1 * | 2/2010 | Adler et al. | 455/414.1 |
| 2010/0216509 A1 * | 8/2010 | Riemer et al. | 455/557 |
| 2010/0234071 A1 | 9/2010 | Shabtay et al. | |
| 2010/0311416 A1 | 12/2010 | Abichandani et al. | |

(Continued)

FOREIGN PATENT DOCUMENTS

| | | | |
|---|---|---|---|
| EP | 1589727 A1 | 10/2005 | |
| GB | 2420059 B | 11/2006 | |

OTHER PUBLICATIONS

Halfbakery, "Cell Phone Use Control," www.halfbakery.com/idea/Cell_20Phone_20Use_20Control, May 25, 2010.

(Continued)

*Primary Examiner* — Khalid Shaheed

(57) ABSTRACT

Methods and corresponding systems are provided for limiting mobile station operation when multiple mobile stations are moving together in a group. Such group movement includes but is not limited to movement in a vehicle. According to disclosed methods, a determination is made that multiple mobile stations are moving substantially together, and in response to the determination, operation of one or more of the mobile stations is limited.

18 Claims, 5 Drawing Sheets

(56) References Cited

U.S. PATENT DOCUMENTS

| | | | |
|---|---|---|---|
| 2011/0105097 A1* | 5/2011 | Tadayon et al. | 455/418 |
| 2011/0136509 A1* | 6/2011 | Osann, Jr. | 455/456.3 |
| 2011/0137520 A1* | 6/2011 | Rector et al. | 701/36 |

OTHER PUBLICATIONS

Halfbakery, "Cell Phone Block While Driving," www.halfbakery.com/idea/Cell_20Phone_20Block_20Driving, May 25, 2010.

Jennifer Johnson, "TXTBlocker Lets Users Disable Texting & Other Features While Driving," www.hothardware.com/News/TXTBlocker-Lets-Users-Disable-Texting--Other-Features-While-Driving/, Oct. 3, 2009.

Textecution—Premium Mobile Device Safety Application, "Frequently Asked Questions," www.textecution.com/faqs.php, May 25, 2010.

ZoomSafer, "ZoomSafer eliminates the temptation to text while driving and keeps you connected via hands-free services," www.zoomsafer.com/personal.aspx, Jan. 4, 2010.

* cited by examiner

METHODS AND SYSTEMS FOR LIMITING MOBILE STATION OPERATION IN A GROUP SETTING

BACKGROUND

Cellular wireless is an increasingly popular means of personal communication in the modern world. People are using cellular wireless networks for the exchange of voice and data over such devices as cellular telephones, personal digital assistants (PDAs), cellular modems, and other mobile stations.

In a typical cellular wireless communication system, an area is divided into cells and cell sectors, each defined by a radiation pattern (on a particular frequency) from a respective base station or "base transceiver station." Each base station is then typically connected with core network equipment that functions to provide connectivity with a transport network such as the public switched telephone network (PSTN) or the Internet for instance, and that may function to control base station operation and handoff of served client devices from one base station to another. Conveniently with this arrangement, a cellular phone or other mobile station that is positioned within the coverage area of a given sector can communicate over an air interface with the base station and in turn via the core network equipment with entities on the transport network.

Mobile stations and base stations generally communicate with each other over a radio frequency (RF) air interface according to a defined air interface protocol, examples of which include CDMA, iDEN, WiMAX, TDMA, AMPS, GSM, GPRS, UMTS, EDGE, LTE, WI-FI, BLUETOOTH, and others now known or later developed. Such air interface communication typically occurs on a frequency known as a "carrier" (which may actually be a pair of frequencies, one for forward link communications from the base station to the mobile station, and another for reverse link communication from the mobile station to the base station). On such a carrier, the base station may emit a pilot signal, which is a control signal that a mobile station may detect as an indication of base station coverage. In particular, as the mobile station moves into the coverage of a base station and is operating on the base station's carrier, the mobile station may detect the base station's pilot signal. In response, the mobile station may then hand off to operate in the indicated coverage area. A wireless service provider typically operates numerous base stations in a given geographic region, to provide robust air interface coverage as mobile stations move from one location to another.

OVERVIEW

The use of mobile stations is a convenient and popular means of personal communication. However, it may be beneficial to limit the use of mobile stations under certain circumstances, such as when multiple mobile stations are moving together in a group. Disclosed herein are methods and corresponding systems for (i) determining that multiple mobile stations are moving substantially together (i.e., in a group), and (ii) responsively limiting operation of one or more of the mobile stations.

Limiting mobile station operation may be especially beneficial if a group of mobile stations is in a moving vehicle. For instance, if three people are traveling in a vehicle and each person has their own respective mobile station, it may be beneficial to limit operation of the mobile station belonging to the person driving the vehicle. One factor indicating that multiple mobile stations are likely traveling together in a vehicle is that the mobile stations are moving substantially together. Additional factors making it more likely that the mobile stations are traveling together in a vehicle include that the mobile stations are moving along a roadway and/or that the mobile stations are moving at a driving speed.

In accordance with one exemplary method disclosed herein, a network server may determine that multiple mobile stations are moving substantially together, and based at least in part on that determination, the network server may limit operation of one or more of the mobile stations. The network server may determine that the multiple mobile stations are moving substantially together by tracking respective base station handoffs of the mobile stations. Examples of mobile station operations that may be limited include text-messaging service and/or non-hands-free voice communications, among other possibilities.

In accordance with another exemplary method disclosed herein, a network server may determine that multiple mobile stations are moving substantially together and, in response to determining that the mobile stations are moving substantially together, the network server may (i) evaluate respective user profiles of each of the mobile stations and (ii) limit operation of one or more of the mobile stations based at least in part on the evaluation of the user profiles. Each of the user profiles may define an age of a user of the corresponding mobile station, and the profiles may define genealogical relationships between users of the mobile stations, among other possibilities. Thus, for instance the network server may use those relationships as a basis to determine which of the mobile stations in the group to limit.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION

1. Exemplary Architecture a. Exemplary Communication System

Figure 1:
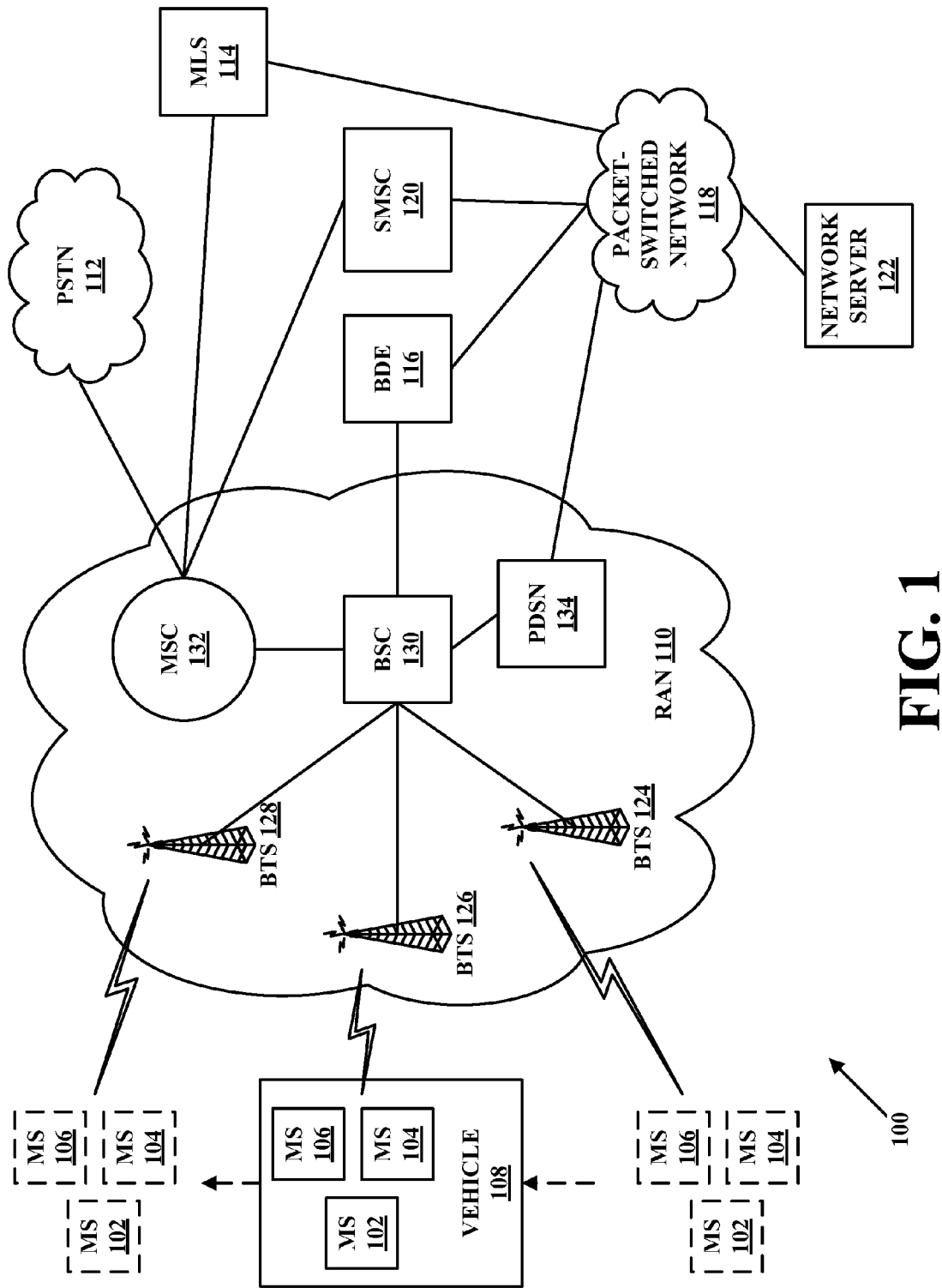
FIG. 1 is a simplified block diagram of an exemplary communication system.

Referring now to the drawings, FIG. 1 is a simplified block diagram illustrating one embodiment of a wireless communication system 100 (the "system") in which the above-mentioned methods may be carried out. It should be understood, however, that this and other arrangements and functions described herein (including in the above overview section) are set forth for purposes of example only, and other arrangements and functions can be used instead and some may omitted altogether. Further, as in most telecommunications applications, those skilled in the art will appreciate that many of the elements described herein are functional entities that may be implemented with hardware, firmware and/or software (e.g., one or more processors executing program instructions), and as discrete components or in conjunction with other components, in any suitable combination and location. Still further, the names of various components are not intended to indicate association with just one type of system. Various systems may use analogous components under other names.

By way of example, the system 100 is shown to include three representative mobile stations 102, 104, 106 in a vehicle 108, a radio access network (RAN) 110, a public switched telephone network (PSTN) 112, a mobile location system (MLS) 114, base station determining equipment (BDE) 116, a packet-switched network 118, a short message service center (SMSC) 120, and a network server 122. As disclosed herein, "a vehicle" includes any means of carrying or transporting a mobile station user and may encompass a car, truck, boat, aircraft, or other vehicle. In addition, the phrase "in a vehicle" is not meant to exclude on a vehicle.

At the core of the communication system of FIG. 1 is the RAN 110, which is arranged to serve one or more mobile stations, such as representative mobile stations 102, 104, 106. RAN 110 may serve mobile stations in accordance with any agreed air interface protocol, examples of which include those noted above. As shown, the example RAN 110 includes three base transceiver stations (BTSs) 124, 126, 128, a base station controller (BSC) 130, a mobile switching center (MSC) 132, and a packet data serving node (PDSN) 134. Each BTS radiates to define an air interface providing coverage through which mobile stations may communicate wirelessly with the BTS. As shown, BTSs 124, 126, 128 are coupled with BSC 130. In turn, BSC 130 is coupled with MSC 132 and PDSN 134, which provide connectivity with PSTN 112 and packet-switched network 118 respectively. The packet-switched network may include the Internet and/or a service provider's core packet network.

With this example arrangement, when mobile stations are positioned in the coverage area of a given BTS and are served by the BTS, the mobile stations may engage in communication with entities on PSTN 112 and packet-switched network 118. For instance, mobile station 102, which is positioned in the coverage area of BTS 126 and served by BTS 126, may communicate with SMSC 120 and network server 122, which are both entities on packet-switched network 118. In general, SMSC 120 functions to enable SMS messaging between and among various entities by providing store-and-forward services with respect to SMS messages.

Each BTS in the system may include one or more antennas arranged to produce radiation patterns defining one or more sectors. The antennas may take various forms. For example, the antennas may comprise antenna arrays. Further, although not shown, each BTS would include various other equipment, such as one or more power amplifiers arranged to amplify communication traffic for transmission over the air from the BTS antennas.

In the example arrangement shown in FIG. 1, BSC 130 generally functions to control BTSs 124, 126, 128, such as to control handoffs of mobile stations 102, 104, 106 between the BTSs, and to manage other aspects of air interface operation. Although system 100 includes only one BSC (i.e., BSC 130), in another embodiment there may be multiple BSCs. Either way, MSC 132 and/or PDSN 134 may function to control the one or more BSCs, such as to control handoffs of mobile stations between BSC serving areas for instance.

Each BTS may engage in radio frequency (RF) communication with mobile stations using one or more carrier frequencies. Communications can be imposed onto the carrier frequencies using any form of modulation, such as amplitude modulation, frequency modulation, phase modulation, code modulation, and/or others.

In operation, when a mobile station, such as representative mobile station 102, is within a sector of a cell defined by a BTS, the mobile station may wirelessly communicate with the BTS on one or more of the carrier frequencies. As the mobile station moves from that sector into another sector, the wireless communication system may automatically switch the mobile station's point of contact with the system. For instance, if mobile station 102 moves from one sector of BTS 126 to another sector of BTS 126, BTS 126 or BSC 130 may orchestrate a handoff through which the system may begin communicating with the mobile station via the new sector and may discontinue communication with the mobile station via the old sector. Discontinuing communication with the mobile station via the old sector may occur either before or after a connection is made with the new sector. Likewise, if mobile station 102 moves from a sector of BTS 124 into a sector of BTS 126 (as indicated in FIG. 1 by a dashed arrow), BSC 130 may orchestrate a handoff through which the system begins communicating with the mobile station via the new sector of the new BTS (i.e., BTS 126) and may discontinue communicating with the mobile station via the old sector of the old BTS (i.e., BTS 124). Herein, "base station handoff," "mobile station handoff," and more generally "handoff", are used interchangeably to describe the above-mentioned activity.

As noted above in the overview section, one way to determine that multiple mobile stations are moving substantially together is to track respective base station handoffs of the mobile stations. If the respective handoffs occur at about the same time and between the same wireless coverage areas, then the mobile stations may be moving substantially together. A more detailed discussion of handoffs is presented below.

Generally, mobile station handoff between coverage areas (such as cells or cell sectors) can be triggered by numerous factors. Most commonly, for instance, handoff may be triggered by a threshold change in signal strength or signal quality, as may happen when a mobile station physically moves from one coverage area to another, or when air interface conditions change in one coverage area or another and thereby impact signal quality. Further, handoff may occur for load balancing purposes. Still other handoff triggers may be possible as well.

By way of example, if a mobile station is operating in a sector and receiving forward link communications with a particular strength or signal-to-noise ratio, the mobile station may begin receiving from another sector forward link communications that have threshold higher strength or signal-to-noise ratio. Upon detecting the better signal, the mobile station may then send a report signal in a reverse link control channel message to its serving BTS, which the BTS may pass along to the serving BSC. The BSC may then responsively send a handoff direction command as a forward link control channel message via the BTS to the mobile station. In response, the mobile station may then switch over to communicate with the system on the new sector and either before or after the switch is made, the mobile station may discontinue communication with the system on the old sector.

A mobile station may engage in "soft handoff" or "hard handoff" when moving between coverage areas of a wireless communication system. A "soft handoff" is a handoff that involves making a new connection before breaking an old connection (also known as a "make-before-break" handoff). In operation, a soft handoff may occur if the mobile station is operating on a given carrier frequency in a wireless coverage area and switches over to operate on the same carrier frequency in another coverage area, without first discontinuing the connection with the first coverage area. Such a handoff could occur between BTSs, where two BTSs operate on the same carrier frequency, and where the mobile station moves from communicating via a sector of one BTS on the carrier frequency to communicating via a sector of another BTS on the same carrier frequency. Such a handoff could also occur between sectors of a given BTS, where the mobile station moves from communicating via one sector of the BTS on a given carrier frequency to communicating with another sector of the BTS on the same carrier frequency.

On the other hand, a "hard handoff" is a handoff that involves breaking an old connection before making a new connection (also known as a "break and make" handoff). In practice, a hard handoff may occur if a mobile station is operating on a given carrier frequency in a wireless coverage area, disconnects with that coverage area, and then connects with another coverage area to operate on a different carrier frequency. Such a handoff could occur between two BTSs where the mobile station moves from communicating via a sector of one BTS on one carrier frequency to communicating via a sector of another BTS on a different carrier frequency. This may happen, for example, where the target sector does not operate on the carrier frequency that the mobile station was using in the source sector, such as where the mobile station was using an overlay frequency of the source sector but the target sector does not operate on that overlay frequency. Such a handoff could also occur between sectors of a given BTS or even within a given sector, where the BTS directs the mobile station to switch carrier frequencies for load balancing purposes or for other reasons.

As additionally shown in FIG. 1, BSC 130 is coupled with BDE 116 which may store, evaluate, and forward to other entities in the system 100, handoff records. Additionally or alternatively, MSC 132 and/or PDSN 134 may be coupled with BDE 116 or another handoff-records database. In practice, when an entity such as BSC 130 facilitates or allows a handoff, the entity may store a record of the handoff in a handoff-records database such as BDE 116 for later reference by network administrators or other network entities, or for other purposes.

The handoff records may include data specifying source and target coverage areas, source and target carrier frequencies, indications of success or failure, call drop data, data specific to particular mobile stations such as timing of handoffs and which BTSs and/or coverage areas handoffs occurred between, base station locations, coverage areas and/or BTS locations with respect to roadways, and so forth. For instance, the handoff records may include data indicating that handoff of mobile station 102 was between a coverage area of BTS 124 and a coverage area of BTS 126, and that the handoff occurred at a particular time.

To determine whether mobile station 102 is moving substantially together with other mobile stations, an entity in the system 100 such as network server 122 may be configured to evaluate this data, perhaps by comparing it to similar data regarding handoffs of another mobile station, such as mobile station 104. If such an evaluation is made and the evaluation reveals that respective handoffs for multiple mobile stations occur at about the same time and between the same wireless coverage areas, then a reasonable conclusion is that the mobile stations are moving substantially together. For instance, if the respective handoffs occur within 100 milliseconds of each other and between the same coverage areas, then a reasonable conclusion may be that the mobile stations are moving substantially together. Alternatively, the time parameter used to determine that the handoffs occur at about the same time may be greater than 100 milliseconds, perhaps 30 seconds, depending on the desired level of confidence that the mobile stations are actually moving together. Network sever 122 may access, via packet-switched network 118, handoff records stored in BDE 116 by querying BDE 116. Additionally or alternatively, BDE 116 may be configured to automatically forward, to a server such as network server 122, handoff data corresponding to particular mobile stations (e.g., mobile stations associated with subscribers of a group-based mobile station operation limitation service). Still alternatively, BDE 116 itself may carry out functions of the network server.

Each of the couplings of the system 100 may be an interface such as a trunk level 1 (T1) line, an Ethernet line, a signaling link, or one or more other connections (wired and/or wireless). In general, a system will be designed with sufficient capacity in these links to support an expected amount of traffic.

b. Exemplary Mobile Station

Figure 2:
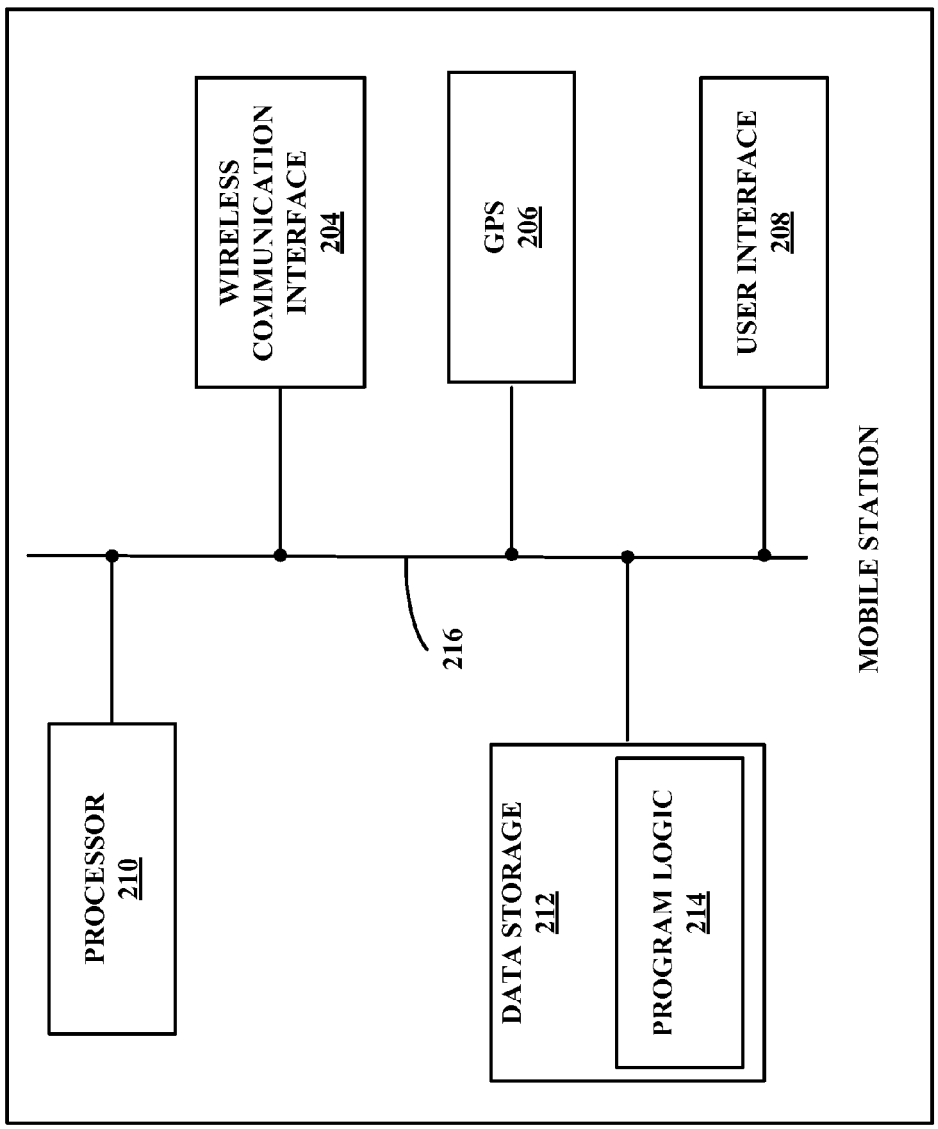
FIG. 2 is a simplified block diagram of an exemplary mobile station.

FIG. 2 is a simplified block diagram showing some of the functional components that can be included in a mobile station, such as any of the representative mobile stations 102, 104, 106. A mobile station may be any device arranged to carry out mobile station functions described herein. For example, a mobile station may comprise a wireless enabled device such as a cellular telephone, a wireless PDA, and/or a wireless laptop computer, among other possibilities. The exemplary mobile station shown in FIG. 2 comprises a wireless communication interface 204, a GPS receiver 206, a user interface 208, a processor 210, and data storage 212, all communicatively linked such as by a system bus, network, or other connection mechanism 216.

Wireless communication interface 204 functions to facilitate wireless communication with one or more BTSs, such as representative BTSs 124, 126, 128. In CDMA, for instance, wireless communication interface 204 may include a transceiver having a rake receiver (not shown) of a type well known in the art, which enables the mobile station to tune to particular PN offsets, so as to facilitate scanning various sectors, and so forth. An exemplary wireless communication interface is an MSM series chipset manufactured by Qualcomm Inc., together with one or more internal or external antennas.

Wireless communication interface 204 may also function to facilitate wireless communication with a vehicle's on-board diagnostics system. Thus, the mobile station may be able to determine vehicle information such as drive status and/or speed. In addition, wireless communication interface 204 may function to facilitate wireless communication with a vehicle's GPS receiver or more generally with a vehicle's navigation system. Thus, the mobile station may be able to determine, via a vehicle's GPS receiver, the location and/or speed of the vehicle. Alternatively, these functions could be provided by other aspects of the mobile station.

GPS receiver 206 functions to communicate with GPS satellites, so as to facilitate determination of the location of the mobile station. For instance, the mobile station may obtain satellite assistance data from a mobile location system (MLS) 114 and, in accordance with that data, may tune to various satellites and measure received satellite signals. With use of the assistance data, the mobile station may then geometrically compute its own location based on the measured satellite signals. Alternatively, the mobile station may provide the satellite signal measurements to the MLS, and the MLS may compute and perhaps store the mobile station's location. Although GPS receiver 206 is shown separate from wireless communication interface 204, the GPS receiver function can be integrated together with the wireless communication interface function, on a single chipset for instance. By way of example, in CDMA, the chipset could be a Qualcomm CDMA chipset having "gpsOne" functionality.

User interface 208 comprises components for receiving input from a user of the mobile station and providing output to a user of the mobile station. For instance, user interface 208 may include a keypad, touch-sensitive screen, microphone, and camera for receiving user input, and a display screen and speaker for providing user output. Further, user interface 208 may include analog/digital conversion circuitry to facilitate conversion between analog user input/output and digital signals on which the mobile station can operate.

Processor 210 comprises one or more general purpose processors (such as INTEL processors or the like) and/or one or more special purpose processors (such as digital signal processors or application specific integrated circuits). To the extent processor 210 includes more than one processor, the processors could work separately or in combination. In addition, the one or more processors may be integrated together with wireless communication interface 204 or other aspect of the mobile station.

Data storage 212 comprises one or more volatile and/or non-volatile storage components, such as optical, magnetic, or organic storage, and data storage 212 can be integrated in whole or in part with processor 210. As shown, data storage 212 comprises program logic 214. In turn, program logic 214 may comprise machine language instructions or other logic executable or interpretable by processor 210 to carry out various mobile station functions described herein.

c. Exemplary Network Server

Figure 3:
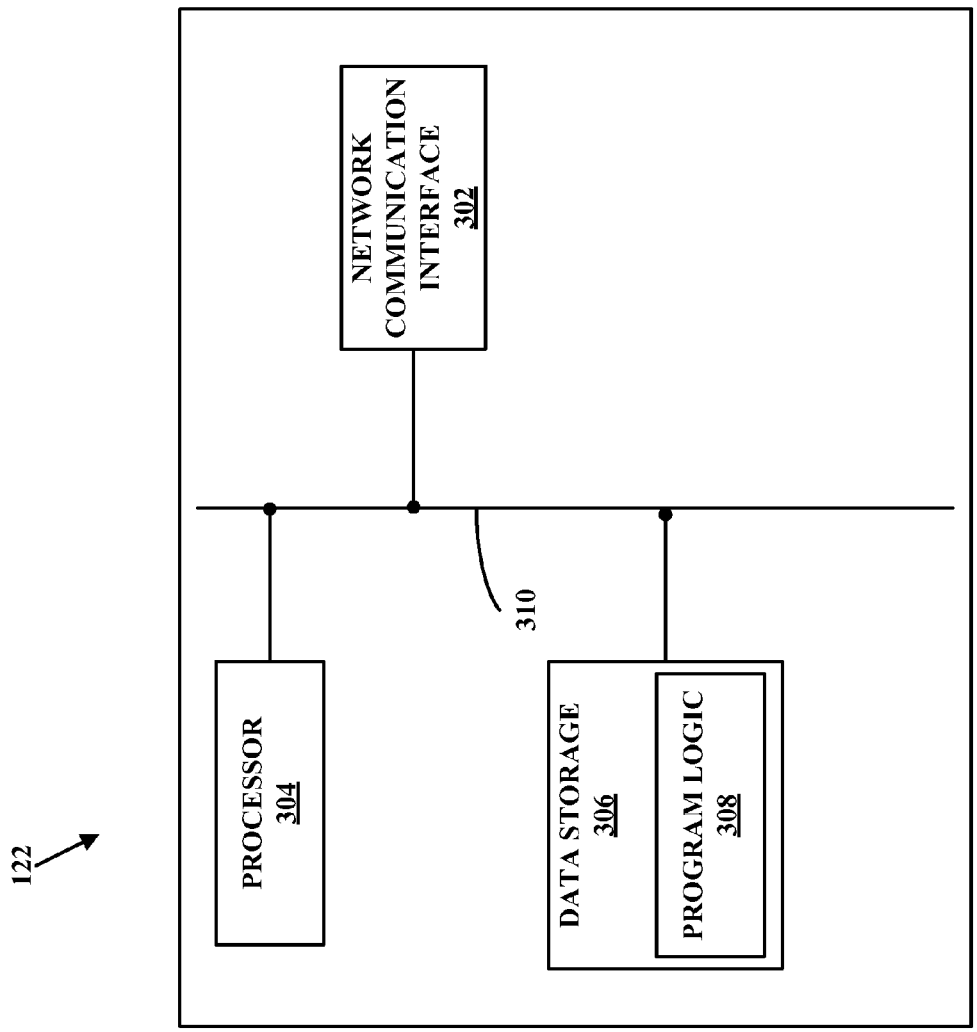
FIG. 3 is a simplified block diagram of an exemplary network server.

FIG. 3 is a simplified block diagram showing some of the functional components that can be included in network server 122 in accordance with an exemplary embodiment. Network server 122 may be any device arranged to carry out network server functions described herein. As shown in FIG. 3, network server 122 comprises a network communication interface 302, a processor 304, and data storage 306, all communicatively linked such as by a system bus, network, or other connection mechanism 310.

Network communication interface 302 functions to provide communication between network server 122 and other network entities and/or networks such as packet-switched network 118. Thus, as explained above, network server 122 can communicate with mobile stations served by RAN 110, such as mobile station 102. In addition, network server 122 can communicate with BDE 116 and SMSC 120 via packet switched network 118.

Processor 304 may comprise one or more general purpose processors (such as INTEL processors or the like) and/or one or more special purpose processors (such as digital signal processors or application specific integrated circuits). To the extent processor 304 includes more than one processor, the processors could work separately or in combination. Data storage 306, in turn, comprises program logic 308 executable by the one or more processors 304 to carry out various network server functions described herein.

2. Exemplary Operation

As noted above in the overview section, limiting mobile station operation may be beneficial in a group setting, especially (but not necessarily) if a group of people, each with a respective mobile station, is traveling in a vehicle. To limit mobile station operation under such circumstances, it may be desirable to first determine that the group is traveling in the vehicle. Determining that the respective mobile stations are moving substantially together is one factor indicating such a scenario. Herein, moving substantially together may mean moving together in an area defined by an average size vehicle or perhaps moving together in an area of another designated size (e.g., an area defined by a mob of people).

Figure 4:
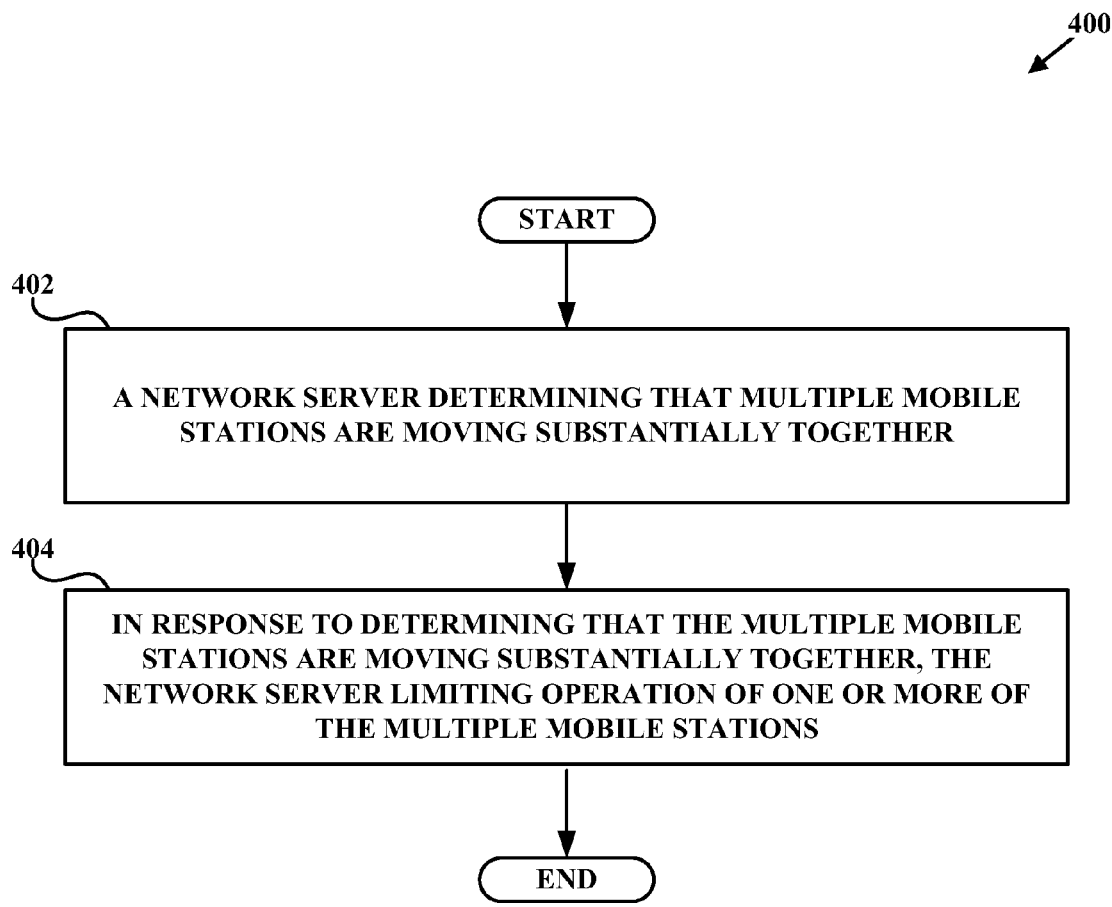
FIG. 4 is a flowchart depicting functions that can be carried out by an exemplary network server, in accordance with an exemplary method.

FIG. 4 is a generalized flowchart depicting functions that can be carried out in the arrangement of FIG. 1, in accordance with an exemplary method. In particular, FIG. 4 shows a method 400 for determining that multiple mobile stations are moving substantially together, and responsively limiting operation of one or more of the multiple mobiles stations, where the method is carried out primarily by a network server.

As shown in FIG. 4, at step 402, a network server determines that multiple mobile stations are moving substantially together, and at step 404, in response to the determination that the multiple mobile stations are moving substantially together, the network server limits operation of one or more of the mobile stations. The following paragraphs discuss these functions in greater detail.

At step 402, a network server such as representative network server 122, determines that mobile stations, such as representative mobile stations 102, 104, 106, are moving substantially together (i.e., in a group) in various ways. For instance, as described above, the network server may determine that the mobile stations are moving substantially together by tracking respective base station handoffs of the mobile stations. More specifically, determining that the mobile stations are moving substantially together may comprise the network server determining that the respective base station handoffs occur at about the same time and between the same wireless coverage areas.

In addition to, or instead of tracking base station handoffs, the network server may determine that the mobile stations are moving substantially together by using GPS (or similar) technology to track respective locations of the multiple mobile stations over a period of time. If the mobile stations change location at about the same time (e.g., within 100 milliseconds or greater than 100 milliseconds, perhaps within 30 seconds, depending on the desired level of confidence that the mobile stations are actually moving together), then it is likely that the mobile stations are moving together. As noted above, the mobile stations may provide satellite signal measurements to MLS 114, and the MLS may compute the locations of the mobile stations. Further, the MLS may be configured to automatically forward, to network server 122, the location of particular mobile stations (e.g., mobile stations associated with subscribers of a group-based mobile station operation limitation service). Furthermore, MLS 114 may comprise a database and may store mobile station locations in the database such that the network server may be able to access the locations via packet-switched network 118, and thus determine that the mobile stations are moving substantially together. Additionally or alternatively, as noted above, a mobile station, such as representative mobile station 102, may have its own GPS receiver and/or may have a communication interface that functions to facilitate wireless communication with a vehicle's GPS receiver, a vehicle's navigation system, and/or a vehicle's on-board diagnostics system. Thus, each of the mobile stations may be able to determine its own location. Therefore, the network server may be able to determine, via communication with the mobile stations, perhaps by SMS messaging, the respective locations of the mobile stations and whether or not the mobile stations are moving substantially together.

At step 404, in response to determining that the mobile stations are moving substantially together, the network server limits operation of one or more of the mobile stations. Limiting mobile station operation may comprise limiting (blocking/prohibiting or disabling) various mobile station capabilities (or functions). In one example for instance, limiting operation of a mobile station may comprise blocking voice communications whenever the mobile station is not in a hands-free mode. In another example, limiting operation of the mobile station may comprise limiting at least one text messaging (e.g., SMS messaging) capability. For instance, manual keying of text messages and/or visible presentation of received text messages may be disabled. In addition, limiting operation of a mobile station may comprise prohibiting the delivery of text messages to the mobile station and/or prohibiting the delivery of text messages from the mobile station. Further, multiple mobile station capabilities may be limited concurrently.

In addition to limiting one or more mobile station capability, other capabilities may be enabled in response to determining that the mobile stations are moving substantially together. For instance, in addition to limiting at least one text messaging capability, audio input of text messages and/or audio output of received text messages may be enabled. Further, enabling a capability may be done automatically as part of any of the above-mentioned limiting. Thus, broadly speaking, limiting operation of a mobile station may comprise limiting at least one capability and enabling at least another capability.

A service directive, such as a directive to limit a requested communication or to modify the communication in some way, may be used to facilitate limiting operation of a mobile station. A service directive may be sent to the mobile station directly or to another entity in the system such as SMSC 120. In addition, a service directive may be sent in any message and at any time. For example, in response to the network server determining that the mobile stations are moving substantially together, the network server may send a service directive to a mobile station, perhaps in an SMS message, directing the mobile station to block a certain text-message-sending capability such as manual keying of text messages. The mobile station may be configured such that, in response to receiving the service directive, the mobile station would limit its operation as directed. In another example, in response to the network server determining that the mobile stations are moving substantially together, the network server may send a service directive to SMSC 120 that directs the SMSC to prohibit SMS messages from being delivered to the mobile station and/or to prohibit SMS messages sent by the mobile station from being delivered to the destination mobile station. The SMSC may be programmed to respond to such a directive and to accordingly limit SMS messaging to/from the mobile station.

In addition to limiting operation of one or more of the mobile stations in response to determining that the mobile stations are moving substantially together, the network server may require that one or more conditions are met before the network server limits operation of one or more of the mobile stations. These conditions may further indicate that the mobile stations are traveling together in a vehicle.

For example, the network server may limit operation of one of the mobile stations in response to determining that the mobile stations are moving substantially together at greater than a threshold rate (e.g., a typical driving speed). The network server may determine that the mobile stations are moving substantially together at greater than a threshold rate in various ways. For instance, the network server may detect, via communication with a handoff-records database such as BDE 116, more than a threshold number of base station handoffs in a particular amount of time for at least one of the mobile stations. In addition to, or instead of using base station handoffs, the network server may use GPS (or similar) technology to determine the rate at which the mobile stations are moving by tracking a series of locations of at least one of the mobile stations over a period of time.

As noted above, the network server may determine the location of a mobile station via direct communication with the mobile station and/or communication with the MLS. In the case where the network server determines the location of a mobile station via communication with the MLS, if the MLS stores the locations and the respective times at which the mobile station was at each location, and if the MLS comprises logic to compute the rate of movement, then the network server may determine the rate by obtaining (e.g., by querying the MLS or otherwise communicating with the MLS via the packet-switched network) the rate of movement from the MLS. If the MLS does not comprise logic to compute the rate of movement but the network server does, then the network server may obtain the locations and respective times of the mobile station from the MLS and then compute the rate of movement itself. Further, the MLS may automatically forward to the network server the rate of movement and/or the locations and respective times of particular mobile stations (e.g., mobile stations associated with subscribers of a group-based mobile station operation limitation service). In the case where the network server determines the location of a mobile station via communication with the mobile station (e.g., where the mobile station computes or determines its own location and the location is then communicated, perhaps by SMS messaging, to the network server), the mobile station may communicate to the network server, perhaps via SMS messaging, the respective time at which the mobile station was at the location. Thus, if a series of locations for a mobile station and their respective times are communicated to the network server and the network server comprises the appropriate logic, the network server may compute the rate of movement.

In another example, the network server may limit operation of one of the mobile stations in response to determining that the mobile stations are moving substantially together along a roadway. The network server may determine that the mobile stations are moving substantially together along a roadway in various ways. For instance, a handoff-records database such as BDE 116, or a server on the packet-switched network such as network server 122, may store information regarding locations of base stations with respect to roadways and/or wireless coverage areas with respect to roadways. In addition, BDE 116 and/or network server 122 may comprise mapping logic for determining that a mobile station is traveling along a roadway based on the mobile station's location. If the network server stores information regarding wireless coverage areas with respect to roadways or comprises mapping logic as mentioned above, and the network server receives, from BDE 116 via packet-switched network 118, a series of coverage areas in which one of the mobile stations has been served and/or is being served, the network server may be able to determine that the mobile station is traveling along a roadway. If the BDE stores information regarding wireless coverage areas with respect to roadways and/or comprises mapping logic, then the BDE may detect that the mobile station is moving along a roadway based on the handoff records of the mobile station. Then, either automatically or in response to a request from the network server, the BDE may transmit this information to the network server via the packet-switched network. Alternatively, the network server may query the BDE to retrieve this information.

Additionally or alternatively, a mobile station may contain its own GPS receiver and mapping logic for determining, based on the mobile stations location, that the mobile station is traveling along a roadway. Further, a mobile station may be able to communicate with a vehicle's GPS receiver or more broadly, with a vehicle's navigation system. After the mobile station determines that it is traveling along a roadway, the mobile station may communicate this information to the network server, perhaps via an SMS message.

Figure 5:
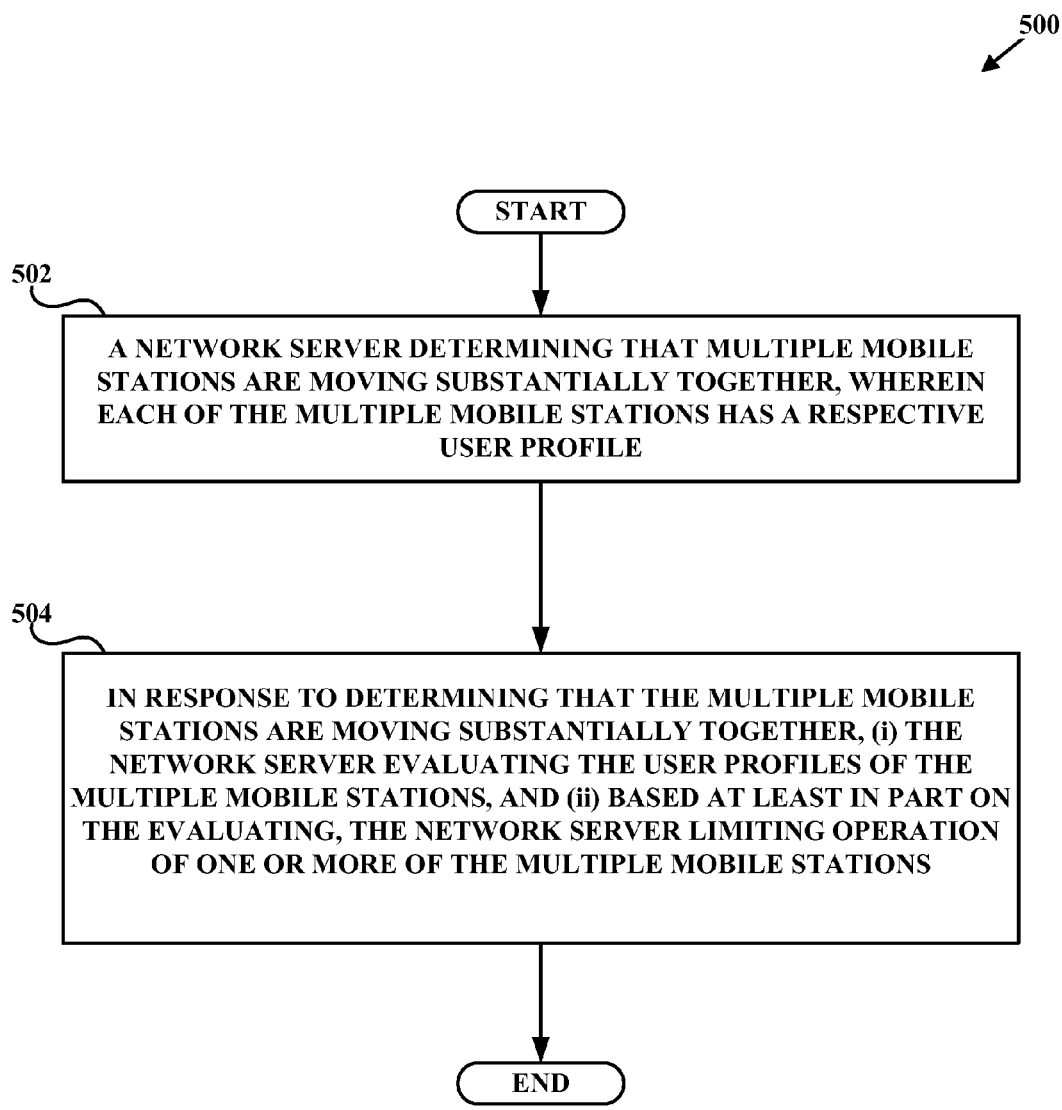
FIG. 5 is another flowchart depicting functions that can be carried out by an exemplary network server, in accordance with another exemplary method.

FIG. 5, like FIG. 4, is a generalized flowchart depicting functions that can be carried out in the arrangement of FIG. 1, in accordance with an exemplary method. More specifically, FIG. 5 shows a method 500 for determining that multiple mobile stations, each with a respective user profile, are moving substantially together, and responsively limiting operation of one or more of the multiple mobile stations, where the method is carried out primarily by a network server.

As shown in FIG. 5, at step 502, a network server, such as representative network server 122, determines that multiple mobile stations, such as representative mobile stations 102, 104, 106, are moving substantially together, where each of the mobile stations has a respective user profile. And at step 504, in response to determining that the mobile stations are moving substantially together, (i) the network server evaluates the user profiles of the mobile stations, and (ii) limits operation of one of more of the mobile stations based at least in part on the evaluation of the user profiles.

Limiting mobile station operation when multiple mobile stations are moving together, specifically in a vehicle, may be most beneficial with respect to a mobile station belonging to the person driving the vehicle. Profile information of a user (i.e., a user profile) associated with a mobile station may be used to infer whether the user is driving the vehicle or not. Such information may indicate (define) the age of the user and/or whether the user is legally permitted to drive a vehicle. Additionally, user profile information may indicate the genealogical relationship of the user to other mobile station users, perhaps other mobile station users who are traveling with the user. Thus, if mobile stations 102 and 104 are traveling together in a vehicle and their user profiles indicate that the user associated with mobile station 102 is the father of the user associated with mobile station 104, then it may be inferred that the father is driving the vehicle, and therefore it may be most beneficial to limit operation mobile station 102.

User profile information may also define at least one circumstance when the network server should limit operation of the mobile station. For instance, the user profile for mobile station 102 may indicate that operation of mobile station 102 should be limited if a particular other mobile station, such as representative mobile station 104, is traveling with mobile station 102.

An account record for a mobile station may include user profile information about a user associated with the mobile station. This information may be stored in various entities in system 100 such that the network server may have access to the information, perhaps by querying the entity. For instance, user profile information may be stored in the mobile station, in an HLR (not shown), in a BDE, and/or in the network server itself. As a specific example, the mobile station may store in its data storage, user profile information of a user associated with the mobile station. The mobile station my then transmit the user profile information, perhaps in an SMS message in response to the mobile station handing off or in response to a request for such information, to the network server. Additionally or alternatively, if the network server stores the profile information, then it may simply retrieve the information.

At step 502 a network server determines that multiple mobile stations are moving substantially together, where each of the mobile stations has a respective user profile. Determining that multiple mobile stations are moving substantially together is described in detail with respect to method 400 and such description is equally applicable here.

At step 504, in response to determining that the mobile stations are moving substantially together, (i) the network server evaluates the user profiles of the mobile stations, and (ii) limits operation of one of more of the mobile stations based at least in part on the evaluation of the user profiles. Evaluating the user profiles may comprise analyzing the user profiles by comparing or considering them, among other possibilities. For example, in response to determining that three mobile stations are moving substantially together in a vehicle, where each mobile station has a respective user profile that defines a genealogical relationship of the user, a network server may evaluate the user profiles of the three mobile stations by comparing or considering their genealogical relationships. The evaluation may reveal that the three mobile stations belong to a father, his son, and his daughter. In another scenario, in response to determining that three mobile stations are moving substantially together in a vehicle, where each mobile station has a respective user profile that defines the age of the user, a network server may evaluate the user profiles of the three mobile stations by comparing or considering their respective ages. The evaluation may reveal that the mobile stations belong to a user of age 21, a user of age 13, and a user of age 8.

It should be understood that the user profiles for a group of mobile station users moving substantially together may not all indicate the same factors. For instance, if a group of three mobile station users, each with a respective mobile station, is traveling together in a vehicle, each of the three user profiles may indicate the age of the respective user. However, only two of the three user profiles may indicate the respective genealogical relationship of the user and perhaps only one of the user profiles may indicate a circumstance when the network server should limit operation of the mobile station associated with that user profile.

In addition to evaluating the user profiles in response to determining that the mobile stations are moving substantially together, the network server also limits operation of one of more of the mobile stations based at least in part on the evaluation. For instance, in one of the above examples, the evaluation of the user profiles in response to determining that the mobile stations are moving substantially together revealed that the three mobile stations traveling together in the vehicle belong to a father, his son, and his daughter. In that situation, it is likely that the father is driving the vehicle and, therefore, based at least in part on the evaluation, the network server may limit operation of the father's mobile station.

Limiting mobile station operation is described in detail above with respect to method 400 and that description is equally applicable here. For instance, despite the network server limiting operation of one of more of the mobile stations based at least in part on the evaluation of the user profiles, the network server may require that one or more conditions are met (e.g., that the mobile stations are moving substantially together at greater than a threshold rate) before the network server limits operation of one or more of the mobile stations. Further, in the event that a service directive is used to facilitate limiting operation of a mobile station, the network server may send the service directive to the mobile station and/or the SMSC in response to evaluating the user profiles of the mobile stations.

After the network server has limited operation of one or more of the mobile stations, it may be desirable to adjust at least one limitation of one or more of the mobile stations. For instance, if the mobile stations are no longer moving (e.g., the vehicle in which the mobile stations are traveling has come to a stop), then it may be desirable to remove all limitations that have been imposed on any of the mobile stations. Thus, if the network server determines that the mobile stations are no longer moving, then the network server may responsively adjust at least one limitation of one or more of the mobile stations. Alternatively or additionally, the network server and/or the mobile station itself may adjust a limitation on the mobile station automatically after the limitation has been imposed for a predetermined amount of time. The network server may adjust a limitation in much the same way that it imposes a limitation. For example, the network server may send a service directive to the mobile station and/or to the SMSC.

It should be understood that adjusting a limitation may comprise removing the limitation or modifying the limitation. Further, adjusting at least one limitation of one or more of the mobile stations may include adjusting a single limitation or a combination of limitations of one of the mobile stations or of more than one of the mobile stations.

3. Conclusion

Various exemplary embodiments have been described above. Those skilled in the art will understand, however, that changes and modifications may be made to those examples, and that those examples may be combined, without departing from the scope of the claims.

What is claimed is:

1. A method comprising:
a network server determining that multiple mobile stations are moving substantially together, wherein determining that multiple mobile stations are moving substantially together comprises determining that respective handoffs of the multiple mobile stations occur (i) at substantially the same time and (ii) between identical wireless coverage areas, and wherein each of the multiple mobile stations has a respective user profile; and
in response to determining that the multiple mobile stations are moving substantially together, (i) the network server evaluating the user profiles of the multiple mobile stations, and (ii) based at least in part on the evaluating, the network server limiting operation of one or more of the multiple mobile stations by (a) prohibiting at least one text messaging capability of each of the one or more of the multiple mobile stations and (b) prohibiting non-hands-free voice communications of each of the one or more of the multiple mobile stations while allowing hands-free voice communications of each of the one or more of the multiple mobile stations.

2. The method of claim 1, wherein each of the multiple mobile stations comprises at least one of a cellular telephone and a wireless personal digital assistant (PDA).

3. The method of claim 1, wherein the user profile of each of the multiple mobile stations defines an age of a user of the mobile station, and wherein evaluating the user profiles comprises comparing the ages of the users of the multiple mobile stations.

4. The method of claim 1, wherein the user profile of each of the multiple mobile stations defines a genealogical relationship of a user of the mobile station, and wherein evaluating the user profiles comprises considering the genealogical relationships of the users of the multiple mobile stations.

5. The method of claim 1, wherein the user profile of at least one of the multiple mobile stations defines at least one circumstance when the network server should limit the operation of the at least one of the multiple mobile stations, and wherein limiting the operation of the one or more of the multiple mobile stations comprises limiting the operation of the at least one of the multiple mobile stations if the at least one circumstance exists.

6. The method of claim 1, further comprising the network server determining that the multiple mobile stations are moving at greater than a threshold rate, and wherein limiting the operation of the one or more of the multiple mobile stations comprises limiting the operation of the one or more of the multiple mobile stations based at least in part on determining that the multiple mobile stations are moving at greater than the threshold rate.

7. The method of claim 6, wherein determining that the multiple mobile stations are moving at greater than a threshold rate comprises detecting more than a threshold number of base-station handoffs in a particular amount of time for at least one of the multiple mobile stations.

8. The method of claim 6, wherein determining that the multiple mobile stations are moving at greater than a threshold rate comprises using global positioning system (GPS) technology for tracking a series of locations of at least one of the multiple mobile stations over a period of time.

9. The method of claim 1, wherein prohibiting at least one text messaging capability comprises disabling manual keying of text messages.

10. The method of claim 1, wherein prohibiting at least one text messaging capability comprises disabling visible presentation of received text messages.

11. The method of claim 1, wherein limiting the operation of the one or more of the multiple mobile stations further comprises enabling at least one text messaging capability selected from the group consisting of audio input of outgoing text messages and audio output of incoming text messages of the one or more of the multiple mobile stations.

12. The method of claim 1, further comprising the network server determining that the multiple mobile stations are no longer moving, and in response to determining that the multiple mobile stations are no longer moving, the network server adjusting at least one limitation of the one or more of the multiple mobile stations, wherein adjusting comprises removing or modifying.

13. The method of claim 1, wherein limiting the operation of the one or more of the multiple mobile stations comprises limiting the operation of the one or more of the multiple mobile stations by sending a service directive to each of the one or more of the multiple mobile stations that directs each of the one or more of the multiple mobile stations to limit the operation of itself.

14. The method of claim 1, wherein limiting the operation of the one or more of the multiple mobile stations comprises limiting the operation of the one or more of the multiple mobile stations by sending a service directive to a short message service center (SMSC) that directs the SMSC to limit the operation of the one or more of the multiple mobile stations by prohibiting SMS messages from being delivered to and from the one or more of the multiple mobile stations.

15. The method of claim 1, further comprising, the network server determining that the multiple mobile stations are moving substantially together along a roadway, and wherein limiting the operation of the one or more of the multiple mobile stations comprises limiting the operation of the one or more of the multiple mobile stations based at least in part on determining that the multiple mobile stations are moving substantially together along the roadway.

16. A system comprising:
a network communication interface;
one or more processors;
data storage; and
program logic executable by the one or more processors to carry out functions including: (i) determining that multiple mobile stations are moving substantially together, wherein determining that multiple mobile stations are moving substantially together comprises determining that respective handoffs of the multiple mobile stations occur (a) at substantially the same time and (b) between identical wireless coverage areas, and wherein each of the multiple mobile stations has a respective user profile, and (ii) in response to determining that the multiple mobile stations are moving substantially together, (a) evaluating the user profiles of the multiple mobile stations, and (b) based at least in part on the evaluating, limiting operation of one or more of the multiple mobile stations by (1) prohibiting at least one text messaging capability of each of the one or more of the multiple mobile stations and (2) prohibiting non-hands-free voice communications of each of the one or more of the multiple mobile stations while allowing hands-free voice communications of each of the one or more of the multiple mobile stations.

17. A method comprising:
a network server determining that multiple mobile stations are moving substantially together, wherein determining that multiple mobile stations are moving substantially together comprises determining that respective handoffs of the multiple mobile stations occur (a) at substantially the same time and (b) between identical wireless coverage areas, and wherein at least one of the multiple mobile stations has a user profile; and
in response to determining that the multiple mobile stations are moving substantially together, (i) the network server evaluating the user profile of the at least one of the multiple mobile stations, and (ii) based at least in part on the evaluating, the network server limiting operation of one or more of the multiple mobile stations by (a) prohibiting at least one text messaging capability of each of the one or more of the multiple mobile stations and (b) prohibiting non-hands-free voice communications of each of the one or more of the multiple mobile stations.

18. The method of claim 17, wherein the user profile of the at least one of the multiple mobile stations comprises information selected from the group consisting of (i) an age of a user of the at least one of the multiple mobile stations, (ii) a genealogical relationship of a user of the at least one of the multiple mobile stations, and (iii) at least one circumstance when the network server should limit operation of one or more of the multiple mobile stations.

\* \* \* \* \*